United States Patent [19]

Zigler

[11] 4,387,330

[45] Jun. 7, 1983

[54] BALANCED SINGLE PHASE ALTERNATING CURRENT INDUCTION MOTOR

[75] Inventor: Robert V. Zigler, Holland, Mich.

[73] Assignee: General Electric Company, Fort Wayne, Ind.

[21] Appl. No.: 188,830

[22] Filed: Sep. 19, 1980

[51] Int. Cl.³ .............................................. H02P 1/44
[52] U.S. Cl. .................................... 318/788; 318/797; 318/817
[58] Field of Search ............... 318/788, 797, 816, 817, 318/770

[56] References Cited

U.S. PATENT DOCUMENTS

| | | | |
|---|---|---|---|
| 2,280,971 | 4/1942 | Packer . | |
| 2,458,436 | 1/1949 | Smith | 318/817 |
| 2,703,859 | 3/1955 | Hutchins et al. | 318/797 |
| 2,818,540 | 12/1957 | Hutchins et al. | 318/797 |
| 3,036,255 | 5/1962 | Lewus . | |
| 3,068,389 | 12/1962 | Cantonwine | 318/797 |
| 3,237,072 | 2/1966 | Cantonwine | 318/797 |
| 3,303,402 | 2/1967 | Martin . | |
| 3,348,109 | 10/1967 | Wright | 318/138 |

Primary Examiner—David Smith, Jr.

Attorney, Agent, or Firm—Ralph E. Krisher, Jr.

[57] ABSTRACT

A single phase alternating current induction type motor is operative at more than one voltage level using the same winding circuitry. The motor has a main winding comprising two serially connected sections similarly formed and physically disposed in slots of a slotted stator core to define a number of primary magnetic poles. A second phase winding, such as a start winding, displaced in phase from the main winding sections, is connected in series with one of the main winding sections and in parallel with the other of the main winding sections. A thermistor is permanently connected in series with the start winding, the thermistor increasing in temperature in response to current flow therethrough to a preselected point where the effectiveness of the second phase winding becomes substantially less than during starting conditions regardless of the operating voltage. In addition, the first phase winding is formed such that at all rated voltage levels of operation, a generally balanced MMF pattern is produced for the primary magnetic poles, both during start and run conditions. To enhance this balance, the two winding sections of the main winding may be bifilarly wound.

12 Claims, 3 Drawing Figures

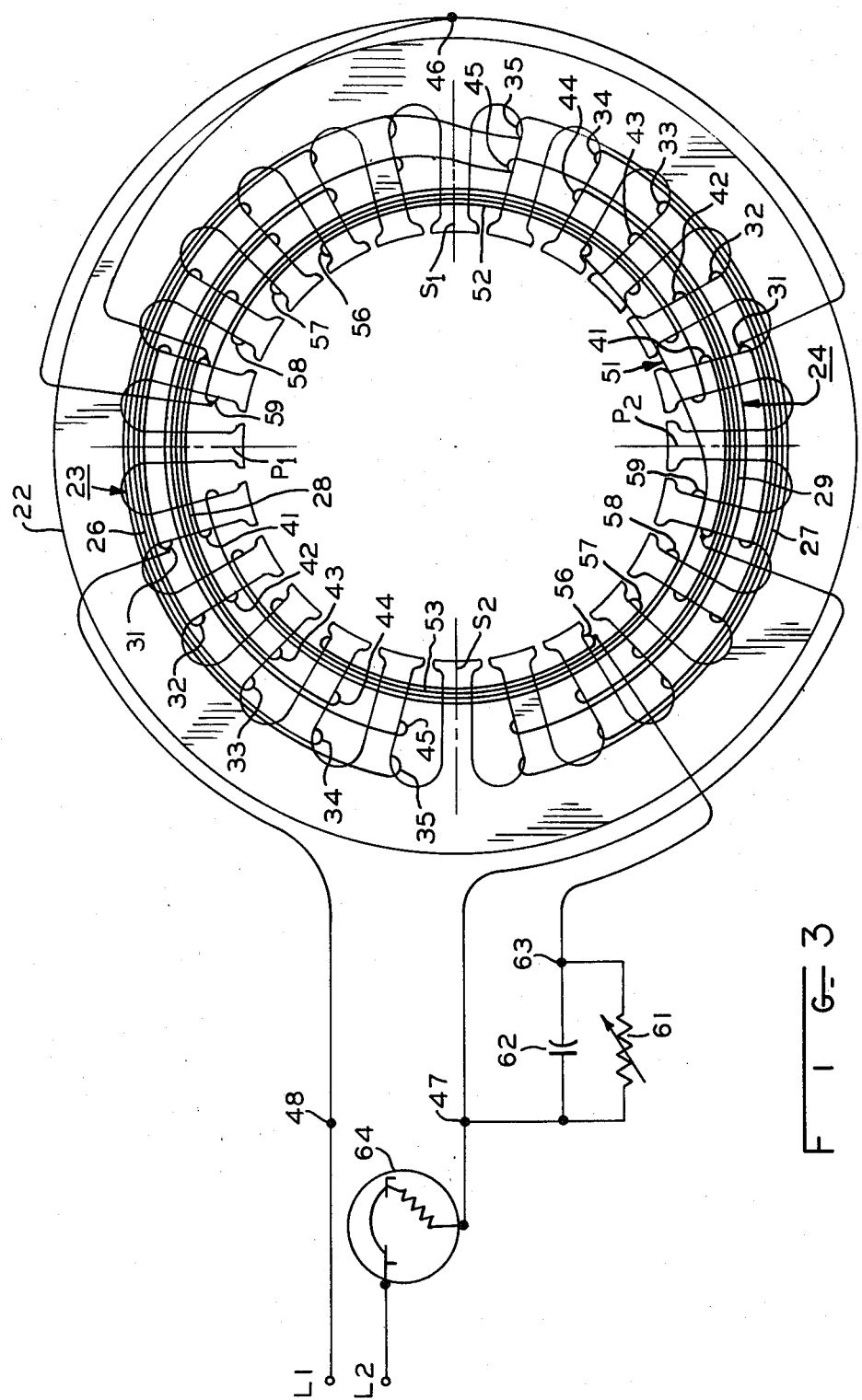

BALANCED SINGLE PHASE ALTERNATING CURRENT INDUCTION MOTOR

BACKGROUND OF THE INVENTION

The present invention relates generally to single phase alternating current induction type electric motors and more particularly to such motors especially designed for use in hermetically sealed compressors and adapted to operate at several voltages without need of moving contact devices.

In certain hermetically sealed compressor applications for such use in connection with refrigeration, air conditioning and the like it is necessary to design single phase A.C. electric motors, that is the stator and rotor components of the compressor for operation at several dissimilar voltages, by way of illustration, 208/230 volts or 220/240 volts. These motors usually utilize a main winding and a start winding displaced in phase from the main winding, with both windings being excited under starting conditions and the start winding being deenergized after the motor has attained so-called running speed, by current sensing or voltage relays or other switches having moving contacts responsive to motor operating conditions disposed externally of the compressor casing. Such external relay with the movable contacts require additional electrical leads from the compressor, are generally noise producing when operating, and are somewhat costly to utilize, among other things.

In an attempt to circumvent the use of external relays, it has been suggested that some solid state arrangement be employed such as the one identified as PRIOR ART in FIG. 1. In this approach a main winding 11 is carried by a slotted stator (not shown) to produce when excited in concentrically disposed coil groups a and b across power terminals L1, L2 a number of primary magnetic poles, such as two poles of opposite polarity in the exemplification. A start winding 12, displaced ninety electrical degrees from the main winding, includes the same number of coil groups, c and d, as those of the main winding and has one of its ends connected to the main winding interpole connection 13. A solid state device mounted externally of the compressor in the form of a positive temperature coefficient resistor 14, a heat responsive current limiting device, and a capacitor 16 are connected in shunt relation to each other between L2 and the other end of the start winding 12. During starting conditions when device 14 is at a low temperature its resistance is such that it permits applied power to by-pass capacitor 16 to energize start winding 12. At a predetermined transition temperature, the resistance of device 14 increases abruptly, usually chosen to coincide with the running speed of the motor, and power is applied through the capacitor 16 but device 14 is operative to reduce substantially the effectiveness of the start winding 12 during running conditions. With this arrangement the main winding is used similar to an auto transformer to power the start winding circuit including device 14 at approximately half voltage. Unfortunately, the main winding poles "a" and "b" carry different net currents and a slight change in current phases which create spatial harmonics in the air gap magnetomotive forces referred to as an unbalanced MMF main polar flux pattern. This in turn seriously affects the torque curve, resulting in a so-called "dip" in the curve or loss of torque as the motor comes up to speed as well as producing side pull forces on the rotor. Side pull adversely affects bearing life and operating noise of the motor. Any attempt to increase the start winding current to compensate for lost starting torque will also increase the unbalance in the main winding poles which in turn increases the adverse dip and side pull characteristics of the motor. These latter motor characteristics could if great enough create failure to start, operating noise, and premature bearing failure problems. Thus, it will be appreciated that this approach has not been entirely satisfactory for one reason or another even though it does employ the desirable solid state device rather than an externally mounted switch having movable contacts to remove the start winding from the winding circuit during running conditions.

SUMMARY OF THE INVENTION

It is therefore a general object of the present invention to provide an improved single phase alternating current induction electric motor and more particularly such motor which is capable of satisfactory operation at different voltages using a solid state device rather than switches and the like for controlling energization of one of the windings. It is a further object to provide such an improved motor capable of use in a hermetically sealed compressor which overcomes a number of the major deficiencies identified above. It is yet another object of the present invention to provide an improved single phase alternating current motor having main and start windings operable at several different voltages with generally balanced MMF patterns of the main winding poles, without need for either reconnection of the motor winding circuits or switches having moving contacts to disengage the start winding after the motor has attained running speed.

In carrying out the objects in one form thereof, I provide an improved single phase alternating current induction type motor capable of operation at more than one voltage level with permanently connected winding circuits. More specifically in the preferred embodiment, the stator core carries a distributed wound main winding formed by two serially connected winding sections each having concentric coil groups having coil sides shared in common slots with the other section, both winding sections together providing a number of primary magnetic poles which correspond in number to the number of coil groups for a given main winding section. The distribution and coil turns of these sections are preselected to produce a generally balanced MMF pattern for the primary magnetic poles during motor operation. To enhance their pattern a bifilar arrangement for the main winding may be employed. An auxiliary winding angularly displaced on the core from the main winding defines magnetic poles equal in number to the primary magnetic poles. This latter winding is connected in series relation with one of the main winding sections but in parallel with the other section, and a solid state device, such as for instance a positive temperature coefficient resistor, is in circuit controlling relation with the auxiliary winding for all operating conditions of the motor. During starting conditions the solid state device permits energization of the auxiliary winding and generally as the motor attains a predetermined speed, such as running speed, the device impedes the effectiveness of the auxiliary winding as compared with starting conditions.

BRIEF DESCRIPTION OF THE DRAWINGS

FIG. 3 is a schematic presentation of an end view of the stator for the motor in FIG. 2 illustrating additional details of the preferred embodiment.

DESCRIPTION OF THE PREFERRED EMBODIMENT

Figure 2:
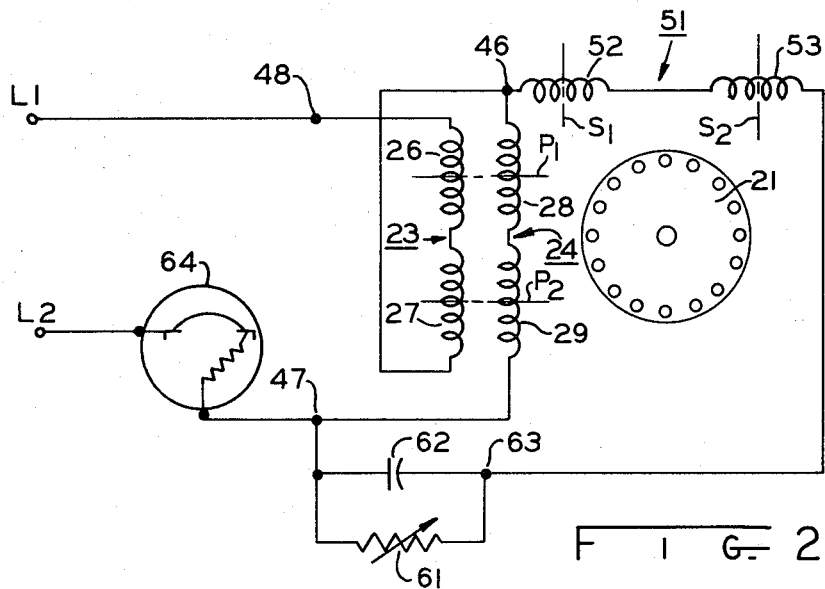
FIG. 2 is a circuit diagram schematically showing a single phase alternating current electric motor incorporating the preferred embodiment of the present invention.

FIGS. 2 and 3 illustrate in schematic form a two pole arrangement for the implementation of the present invention in a single phase alternating current induction motor capable of operating at more than one voltage level. The illustrated motor of the preferred embodiment includes a conventional squirrel cage rotor 21 suitably journaled for rotation within a conventional slotted stator core 22 which has disposed thereon a distributed wound first phase winding, for example a main winding, adapted for excitation across power terminals L1, L2, formed in two serially connected sections 23 and 24. Section 23 includes two coil groups 26, 27 each having five coils 31–35 inclusive while section 24 includes groups 28, 29 also having five coils 41–45 each. The five coils in each of the coil groups 26, 28 are concentrically arranged about primary pole center $P_1$ and share common slots of the stator core in a layer type winding approach. In a similar fashion the coils of cooperating coil groups 27, 29 are arranged concentrically about primary pole center $P_2$. Thus, groups 26, 28 together produce one pole of operation and groups 27, 29 together define the second and opposite pole of the main winding. For best results in producing a substantially balanced MMF pattern for these poles during operation, the two sections of the illustrated embodiment have the same number of effective turns as one another.

Permanently connected in series with main winding section 23 and in parallel with section 24 through connectors 46, 47 is a second phase winding, an auxiliary or start winding 51 in the illustrated form having two coil groups 52 and 53 displaced electrically from the main winding. Each coil group has four concentrically disposed coils 56–59 about polar centers $S_1$, $S_2$ ninety electrical degrees from the main winding magnetic poles $P_1$, $P_2$. A temperature dependent impedance circuit is coupled to the auxiliary winding and has a circuit controlling solid state device 61 in the form of a thermistor, such as a positive temperature coefficient resistor for instance, connected in shunt relation with a run capacitor 62 located in the circuit between auxiliary winding 51 and connector 47. A suitable winding overload protection device 64, such as a thermally responsive switch, is placed on one side of power terminal L2 as indicated in the drawing. For convenience, devices 61 and 64 may take the form of a combination start-protector arrangement of the kind more fully disclosed in the D. H. Stoll U.S. Pat. No. 4,037,316 issued July 26, 1977.

Considering now the manner of operation of the motor of the exemplification, under starting conditions applied A.C. power to the motor across power terminals L1, L2 energizes the start winding 51 along with serially connected main winding sections 23, 24. As current flows through the start winding circuit during starting conditions, the resistance of the thermistor 61 to current flow increases as a function of its temperature. During starting conditions when the thermistor is at low resistance, capacitor 62 is effectively by-passed. Assuming the temperature and resistance of the thermistor are low at start up, the thermistor initially passes current at a value sufficiently great to permit energization of the start winding. After the motor attains a predetermined speed, such as the speed for running operation, the resistance of the thermistor abruptly increases to a value where the effectiveness of the start winding 51 becomes substantially less than during starting conditions and the two serially connected main winding sections 23, 24 become controlling. While the thermistor does not act to obviate entirely current flow to start winding 51 during running conditions of the motor with sections 23, 24 energized in series, it will restrict or throttle current flow to start winding. As disclosed, the motor of the illustrated embodiment is capable of satisfactory operation at more than one rated voltage, for example 208/230 volts or 220/240 volts, non-integer ratios of 1 to 1.11 and 1 to 1.09 respectively. For most single phase induction type motor applications involving fractional horsepower size ratings known to me having non-integer lower order voltage ratios of operation, a cold resistance in the range of 5 to 50 ohms for thermistor 61 should be satisfactory. The circuit having capacitor 62 under running conditions will be operative in parallel with the main winding section 24 and in series relation with section 23.

Figure 1:
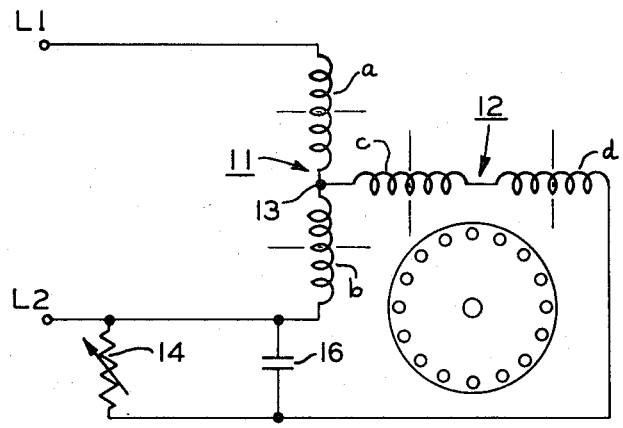
FIG. 1 is a circuit diagram showing the prior art electric motor discussed above.

During both starting and running conditions at the various voltage levels for the motor of the exemplification having the illustrated connections, a generally balanced magnetic MMF pattern for the main winding poles may be produced. This among other benefits minimizes problems with harmonics in the speed-torque curve during operation for the motor which could otherwise adversely affect motor performance. With the unbalanced approach of the FIG. 1 prior art motor it is believed torque dip and side pull characteristics of the motor are greater than those associated with a motor of similar size constructed in accordance with the preferred embodiment. Operation should also be more quiet for the generally balanced motor of the exemplification. So as to obviate generally any magnetic imbalance in the magnetic poles of the main winding during operation at both voltage levels under all operating conditions and to enhance the main polar MMF pattern, sections 23, 24 may be bifilarly formed of the same size wire, that is, with the wire being wound into coils for the individual main winding coil groups 26, 28 and 27, 29 concurrently in two parallel wire strands in close proximity to each other. Thus, the coil turns of both sections carried in the same slots will be next to one another and the coil turn lengths will be quite similar. The present invention also permits utilization of a low voltage thermistor if so desired although slightly higher voltage between adjacent coil turns for the main winding may be experienced than that in the prior art motor of FIG. 1.

The following example is given to show even more clearly how the benefits associated with the illustrated embodiment may be achieved. For the example it will be assumed that the stator is constructed in accordance with FIG. 3 and has an outside nominal diameter of 4.875 inches and a bore nominal diameter of 2.75 inches with a stack length of 1.75 inch. Its rating is ⅓ hp, 2850 r.p.m., 220/240 volts, 50 hz. with device 64 having a cold resistance value of 5 ohms at 25° C. and with capacitor 62 being 15 microfarad. The winding distribution is as follows, with winding sections 23, 24 being bifilar:

| Coil No. In Main Winding | Turns Per Coil | Coil No. In Start Winding | Turns Per Coil |
|---|---|---|---|
| 31, 41 | 22 | 56 | 17 |
| 32, 42 | 26 | 57 | 18 |
| 33, 43 | 29 | 58 | 21 |
| 34, 44 | 34 | 59 | 37 |
| 35, 45 | 34 | | |
| Copper wire 0.0339 inch diameter having 2.64 ohms resistivity. | | Copper wire 0.0239 inch diameter having 3.37 ohms resistivity. | |

The resistance between connectors 48, 63 is 6.01 ohms and between connectors 48, 47 is 5.28 ohms. The motor of the above example is believed to incorporate the advantages brought out heretofore in the discussion in regard to the illustrated embodiment.

It should be apparent to those skilled in the art that while I have shown and described what at present is considered to be the preferred embodiment of the present invention, modifications can be made without actually departing from the true spirit and scope of this invention. By way of example, and not intended as a limitation, the single phase induction motor could be formed so as to operate with a number of poles greater than two. Also for certain applications requiring a motor of the capacitor start-capacitor run type, a suitable start capacitor could be connected in series with the thermistor in the start winding circuit. For a resistance start motor, capacitor 62 could be eliminated and the proper impedance chosen for the main and start winding circuits. I thus intend to cover in the following claims all such equivalent variations as fall within the invention.

What I claim as new and desire to secure by Letters Patent of the United States is:

1. A single phase alternating current induction type electric motor operable at least at two different voltage levels comprising a slotted stator core carrying a distributed wound main winding having at least first and second sections, formed from a plurality of coil groups defining a number of main magnetic poles corresponding in number to the number of sections of such main winding; said coil groups of the first and second sections being carried by common slots and being connected for direct energization at the same time during both starting and running conditions so that windings of both sections for a given pole in such shared slots co-operate to establish the same given pole; a distributed wound directly energized auxiliary winding angularly displaced on the core from the main winding to form a plurality of auxiliary poles and being connected permanently in series circuit with the first main winding section and permanently in parallel circuit relation with the second main winding section during starting and running operation of the at least two different voltage levels; and a thermistor connected in series circuit with the auxiliary winding for controlling energization of the auxiliary winding during operation at each of the at least two different voltage levels.

2. The electric motor of claim 1 in which said first and second sections produce a generally balanced MMF pattern for the main magnetic poles during operation of the motor at least at the two different voltage levels.

3. The electric motor of claim 2 in which the at least first and second main winding sections are bifilarly formed to enhance the generally balanced MMF pattern.

4. The electric motor of claim 2 in which the two different voltage levels are a non-integer.

5. The electric motor of claim 2 in which the thermistor is a positive temperature coefficient resistor operable to substantially lessen the effectiveness of the auxiliary winding as the motor attains running speed during operation at the at least two different voltage levels.

6. A single phase alternating current induction type electric motor having a slotted stator core comprising a first phase winding arranged for continuous direct energization and formed of a plurality of wire turns carried in slots of the core defining at least two serially connected sections and at least two primary magnetic poles, with each pole including a plurality of wire turns from each of the at least two sections; a second phase winding displaced in slots of the core from the first phase winding and being connected for direct energization, during both starting and running conditions, permanently in series circuit with one of the at least two sections and permanently in parallel circuit with another of the at least two sections; and a solid state device in circuit controlling relation with the second phase winding for impeding the effectiveness of said second phase winding generally as the motor attains a predetermined speed of operation.

7. The electric motor of claim 6 in which the wire turns of the at least two sections in each primary magnetic pole are preselected to produce a generally balanced MMF pattern for the primary magnetic poles during starting and running operation.

8. The electric motor of claim 7 in which the two winding sections are formed by bifilar wires.

9. The electric motor of claim 6 in which capacitor means is connected in shunt relation to the solid state device and is effective during running operation of the motor.

10. The electric motor of claim 6 in which the total number of wire turns in each first phase winding section are approximately the same.

11. The electric motor of claim 6 in which the same winding circuits with the same connections are operative at more than one voltage level.

12. The electric motor of claim 11 in which the ratio of two voltage levels is approximately 1 to 1.1.

* * * * *